Figure 1:
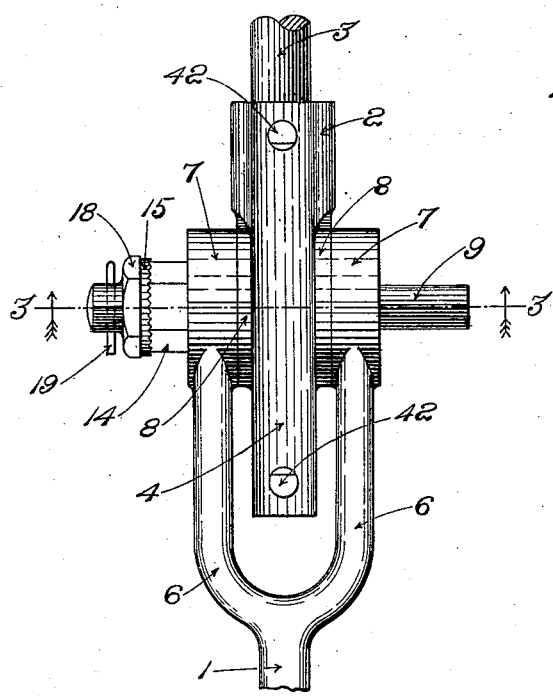

No. 842,847. PATENTED JAN. 29, 1907.
W. B. MASON.
WRIST PIN BEARING FOR ENGINES.
APPLICATION FILED JAN. 16, 1905.

Witnesses:
J. Henry Parker
Alice H. Morrison

Inventor:
William B. Mason
by Macleod, Calver, Cushman & Bailey
Attorneys.

THE NORRIS PETERS CO., WASHINGTON, D. C.

UNITED STATES PATENT OFFICE.

WILLIAM B. MASON, OF BOSTON, MASSACHUSETTS, ASSIGNOR TO THE MASON REGULATOR COMPANY, OF SACO, MAINE, A CORPORATION OF MAINE.

WRIST-PIN BEARING FOR ENGINES.

No. 842,847.      Specification of Letters Patent.      Patented Jan. 29, 1907.

Original application filed December 28, 1903, Serial No. 186,784. Divided and this application filed January 16, 1905.
Serial No. 241,321.

*To all whom it may concern:*

Be it known that I, WILLIAM B. MASON, a citizen of the United States, residing at Boston, county of Suffolk, State of Massachusetts, have invented a certain new and useful Improvement in Wrist-Pin Bearings for Engines, of which the following is a specification, reference being had therein to the accompanying drawings.

This application is a division of the application Serial No. 186,784, filed by me December 28, 1903.

The object of the present invention is to provide an improved wrist-pin and bearing for use in attaching the connecting-rod to the cross-head of an engine.

It is particularly adapted for use in small high-speed engines—such, for instance, as those used in automobiles—where the constant vibration tends to cause the various parts to work loose. It may, however, be used in a variety of other places. In the drawings I have shown the invention in the form in which I have employed it in a small steam-engine for automobiles, because that is the form in which I have put it into actual practice; but it is evident that it may be modified in many ways without departing from the spirit of my invention.

The invention will be fully understood from the following description, together with the accompanying drawings, and the novel features thereof are pointed out and clearly defined in the claims at the close of this specification.

Figure 2:
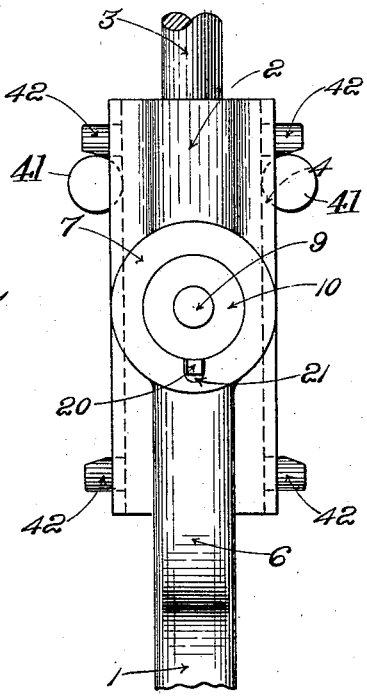
Figure 3:
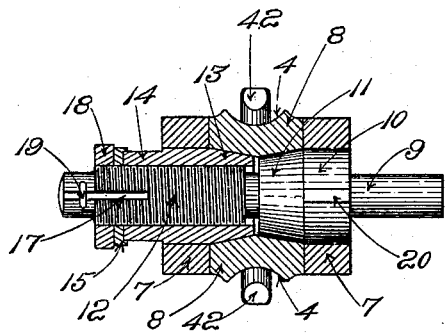
Figure 4:
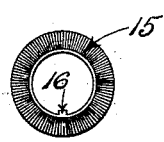

Referring to the drawings, Figure 1 is a view of a pitman-rod, a cross-head, and wrist-pin embodying my invention. Fig. 2 is a side view of the same. Fig. 3 is a section on line 3 3, Fig. 1, looking in the direction indicated by the arrows. Fig. 4 is plan of a washer used in connection with my improved wrist-pin.

In the drawings, the connecting-rod or pitman is indicated by the numeral 1 and the cross-head 2, a portion of the piston-rod being seen at 3. The cross-head 2 consists of a rectangular block of metal having a hole bored therein for a bearing for the wrist-pin 9, by means of which the cross-head and connecting-rod are operatively joined together. The connecting-rod 1 is forked into two arms 6, carrying at their extremities circular bearing-hubs 7. Upon the cross-head 2 and surrounding the hole drilled therein for the bearing are two bosses 8, similar in size and shape to the two bearing-hubs 7. The thickness of the cross-head through the bosses 8 substantially equals the distance between the two inside surfaces of the hubs 7, formed at the extremity of the connecting-rod 1. By this means lateral movement of the cross-head 2 between the arms of the connecting-rod is prevented should the adjustment of the wrist-pin be faulty.

In the center of the bosses 8 of the cross-head 2 is drilled a hole for the reception of the wrist-pin 9, and the interior surfaces of this hole are ground, as shown in Fig. 3, to form cone-bearings.

The outside edges of the cross-head 2 are provided with two grooves 4 (see Figs. 2 and 3) for the reception of balls 41, as described in my previous application hereinbefore referred to. To prevent too great motion of the balls 41, which might result in their dropping or being thrown out of the grooves 4, I provide the cross-head at each end of the grooves with pins 42, fastened in place in the cross-head by any convenient and suitable means. These pins 42 I bevel slightly upon their inside edges in order that at the extremity of the stroke the balls 41 may rest conveniently against them.

The wrist-pin 9, which holds the connecting-rod 1 and cross-head 2 together, is made up in the following manner: Formed upon the wrist-pin 9 and near one end is a cone 10, having a cylindrical bearing-surface to correspond with the holes in the bearing-hubs 7 of the connecting-rod 1 and a conical bearing-surface 11 to correspond with one side of the conically-ground interior of the hole in the cross-head 2. Beyond the inner end of this cone and extending for a considerable portion of the length of the wrist-pin is a threaded portion. (Clearly shown in Fig. 3, and there marked 12.) The pitch of the screw on this threaded portion 12 is relatively small to provide for a fine adjustment of the bearing, and the threaded portion 12 is also provided near its end with a slot or keyway 17. Upon this threaded portion 12 is screwed another cone 13, similar to the cone 10, except that it has a hexagonal portion 14 for the reception of a wrench and has its outside end surface serrated or roughened. Fitting against the end of this cone 13 and having a correspondingly serrated or roughened surface is a washer 15. (See Figs. 1 and 4.) By means of this roughened or serrated surface the washer 15 and cone 13 turn as one piece when held together. Projecting into the interior of this washer 15, as shown in Fig. 4, is a tongue 16, which when the washer is in place engages the groove 17 in the threaded portion of the wrist-pin. This groove is clearly shown in Fig. 3. Outside of the serrated washer 15 and screwing upon the threaded portion 12 of the wrist-pin, is a nut 18, which serves to hold the washer 15 firmly against the end of the cone 13. For additional security I provide the wrist-pin 9 with a cotter 19.

As has heretofore been stated, the cone 10 is formed integral with the wrist-pin 9, and therefore turns with it. The cone 13 is also made to turn as if it were a part of the wrist-pin by the means which I have just described—namely, the slot 17 in the threaded portion of the wrist-pin, the tongued washer 15, the nut 18, and the serrated interlocking bearing-surfaces upon the washer 15 and cone 13. The wrist-pin 9 and its attached pair of cones 11 and 13 are furthermore prevented from rotating in the holes in the bearing-hubs 7 of the connecting-rod 1 by means of a tongue or projection 20, (see Fig. 2,) fast to the cone 10 and adapted to engage a slot 21 in the bearing-hubs 7.

As will be clearly seen from the foregoing description of the construction of the cross-head, connecting-rod, and wrist-pin therefor, the wrist-pin and the cones thereon are carried by the bearing-hubs, forming extensions of the forked arms of the connecting-rod, but that these cones are not rotatable with reference to each other or to the bearing-hubs when in place. These cones are, however, adjustable laterally with regard to each other and to the corresponding conical bearings of the cross-head by the means already described. When the cones on the wrist-pin are adjusted to exactly the right bearing pressure upon the conical surface of the cross-head, all lateral movement of the cross-head upon the wrist-pin is prevented. Should the cones become too widely separated by wear or poor adjustment, the bearing-hubs 7 of the connecting-rod will bear against the bosses 8 upon the cross-head, thereby preventing lateral play to an injurious amount. I have found from actual use of my invention that the parts do not shake loose, but that they run quietly and wear but slightly, thus making frequent adjustment unnecessary. When such adjustment does become necessary, it is readily made.

What I claim is—

1. In a wrist-pin bearing, the combination of a wrist-pin having a threaded portion at one end thereof, said threaded portion having a longitudinal groove therein, a fixed cone fast to the other end of the wrist-pin, a movable cone upon the threaded portion of the wrist-pin and adjustable with relation to the fixed cone, holding means for the movable cone, as a nut upon the threaded portion of the wrist-pin, and a washer interposed between the said nut and the movable cone, having a tongue engaging the slot in the wrist-pin and a serrated surface engaging a similarly-serrated surface upon the movable cone, whereby the wrist-pin the two cones thereon and the holding means for the said movable cone rotate as one piece.

2. In a wrist-pin bearing, the combination of a cross-head, cone-bearings therein, a wrist-pin, adjustable cones thereon rotating with the wrist-pin as one piece, a forked connecting-rod, engaging said wrist-pin, and means whereby the said wrist-pin and the connecting-rod turn together as one piece but are allowed lateral play with relation to each other.

3. In a wrist-pin bearing, the combination of a cross-head having cone-bearings therein, a wrist-pin having adjustable cones thereon rotating with the said wrist-pin as one piece, a connecting-rod engaging the said wrist-pin, a slot in one of the last two mentioned members, and a corresponding projection on the other of said members engaging the said slot, whereby the wrist-pin and connecting-rod turn together as one piece but are allowed lateral play with relation to each other.

In testimony whereof I affix my signature in presence of two witnesses.

WILLIAM B. MASON.

Witnesses:
WILLIAM A. MACLEOD,
GEORGE P. DIKE.